(12) United States Patent
Scott et al.

(10) Patent No.: US 12,190,470 B2
(45) Date of Patent: Jan. 7, 2025

(54) CONTEXTUAL VISUALIZATION WITHIN SPHERICAL IMAGES UTILIZING LOCALIZED SPATIAL LOCATION OF CAPTURE

(71) Applicant: The Boeing Company, Chicago, IL (US)

(72) Inventors: Jeremiah Scott, Kirkland, WA (US); Robert Stephen Kanematsu Baker, Lynnwood, WA (US); Bryan James Beretta, Santa Monica, CA (US); Michael Louis Bernardoni, Newport, RI (US)

(73) Assignee: The Boeing Company, Chicago, IL (US)

( * ) Notice: Subject to any disclaimer, the term of this patent is extended or adjusted under 35 U.S.C. 154(b) by 255 days.

(21) Appl. No.: 17/816,775

(22) Filed: Aug. 2, 2022

(65) Prior Publication Data
US 2024/0046411 A1 Feb. 8, 2024

(51) Int. Cl.
*G06T 3/4038* (2024.01)
*G06T 19/00* (2011.01)

(52) U.S. Cl.
CPC ............ *G06T 3/4038* (2013.01); *G06T 19/00* (2013.01); *G06T 2200/04* (2013.01); *G06T 2200/24* (2013.01); *G06T 2200/32* (2013.01)

(58) Field of Classification Search
CPC .. H04N 23/698; H04N 19/597; H04N 21/816; G06T 19/006; G06T 7/73; G06T 19/003; G06T 2207/10016; G06T 3/4038; G06T 3/12; G06T 15/20; G06T 7/70; G06T 3/40; G06T 15/10; G06T 5/50; G06T 19/00; G06T 15/00; G06T 15/205; G06T 2207/30244; G06T 17/00; G06T 17/05; G06T 7/55; G06T 2210/04; G06T 3/08; G06T 7/60; G06T 2207/20221;
(Continued)

(56) References Cited

U.S. PATENT DOCUMENTS

2020/0280669 A1* 9/2020 Kawaguchi ............ H04N 23/45

FOREIGN PATENT DOCUMENTS

| AU | 2020227025 A1 | 7/2021 |
|---|---|---|
| EP | 3270247 A2 | 1/2018 |

OTHER PUBLICATIONS

European Patent Office Extended Search Report, dated Jan. 16, 2024, regarding Application No. EP23189173.0, 11 pages.
(Continued)

*Primary Examiner* — Xiao M Wu
*Assistant Examiner* — Scott E Sonners
(74) *Attorney, Agent, or Firm* — Yee & Associates, P.C.

(57) ABSTRACT

Visualization within a spherical space is provided. The method comprises capturing a number of images from a common three-point coordinate capture location and creating a sphere of projected coordinates based on the capture location. Three-point coordinates of reference locations corresponding to the images are translated into spherical coordinates on the sphere. The spherical coordinates of the reference locations are translated into tour scene coordinates. The tour scene coordinates of the reference locations are then translated into equirectangular Cartesian coordinates. The images are displayed in a user interface according to the reference locations from the perspective of the capture location.

20 Claims, 11 Drawing Sheets

(58) Field of Classification Search
CPC . G06T 2219/024; G06T 7/38; G06T 2200/08; G06T 7/251; G06T 1/0007; G06T 2200/32; G06F 3/011; G06V 20/20; G06V 40/193
See application file for complete search history.

(56) References Cited

OTHER PUBLICATIONS

Lipson H et al: "Online Product Maintenance by Web-Based Augmented Reality", International CIRP Design Seminar On "New Tools and Workflow for Product Development", Berlin, Germany,, May 14, 1998 (May 14, 1998), pp. 131-143, XP002636537, [retrieved on Jan. 1, 1998].

Luo Cai et al: "Autonomous detection of damage to multiple steel surfaces from 360° panoramas using deep neural networks", Computer-Aided Civil and Infrastructure Engineering, vol. 36, No. 12, Mar. 24, 2021 (Mar. 24, 2021), pp. 1585-1599, XP93113195, US ISSN: 1093-9687, DOI: 10.1111 /mice.12686 Retrieved from the Internet: URL:https://onlinelibrary.wiley.com/doi/full-XML/10.1111 /mice. 12686.

Yang Wenyan et al: "Object Detection in Equirectangular Panorama", 2018 24th International Conference on Pattern Recognition (ICPR), IEEE, Aug. 20, 2018 (Aug. 20, 2018), pp. 2190-2195, XP033457375, DOI: 10.1109/ICPR.2018.8546070 [retrieved on Nov. 26, 2018].

* cited by examiner

CONTEXTUAL VISUALIZATION WITHIN SPHERICAL IMAGES UTILIZING LOCALIZED SPATIAL LOCATION OF CAPTURE

BACKGROUND INFORMATION

1. Field

The present disclosure relates generally to visualization, and more specifically to a method of visualizing information within a spherical space from the perspective of a common point of image capture.

2. Background

Visualization of data common to a physical product is a critical requirement in support of digital enterprises. Spherical imaging is a popular medium for professional and industrial use cases to document and visualize real world locations.

Therefore, it would be desirable to have a method and apparatus that take into account at least some of the issues discussed above, as well as other possible issues.

SUMMARY

An illustrative embodiment provides a computer-implemented method for visualization within a spherical space. The method comprises capturing a number of images from a common three-point coordinate capture location and creating a sphere of projected coordinates based on the capture location. Three-point coordinates of reference locations corresponding to the images are translated into spherical coordinates on the sphere. The spherical coordinates of the reference locations are translated into tour scene coordinates. The tour scene coordinates of the reference locations are then translated into equirectangular Cartesian coordinates. The images are displayed in a user interface according to the reference locations from the perspective of the capture location.

Another illustrative embodiment provides a system for visualization within a spherical space. The system comprises a storage device configured to store program instructions and one or more processors operably connected to the storage device and configured to execute the program instructions to cause the system to: capture a number of images from a common three-point coordinate capture location; create a sphere of projected coordinates based on the capture location; translate three-point coordinates of reference locations corresponding to the images into spherical coordinates on the sphere; translate the spherical coordinates of the reference locations into tour scene coordinates; translate the tour scene coordinates of the reference locations into equirectangular Cartesian coordinates; and display, in a user interface, the images according to the reference locations from the perspective of the capture location.

Another illustrative embodiment provides a computer program product for visualization within a spherical space. The computer program product comprises a computer-readable storage medium having program instructions embodied thereon to perform the steps of: capturing a number of images from a common three-point coordinate capture location; creating a sphere of projected coordinates based on the capture location; translating three-point coordinates of reference locations corresponding to the images into spherical coordinates on the sphere; translating the spherical coordinates of the reference locations into tour scene coordinates; translating the tour scene coordinates of the reference locations into equirectangular Cartesian coordinates; and displaying, in a user interface, the images according to the reference locations from the perspective of the capture location.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
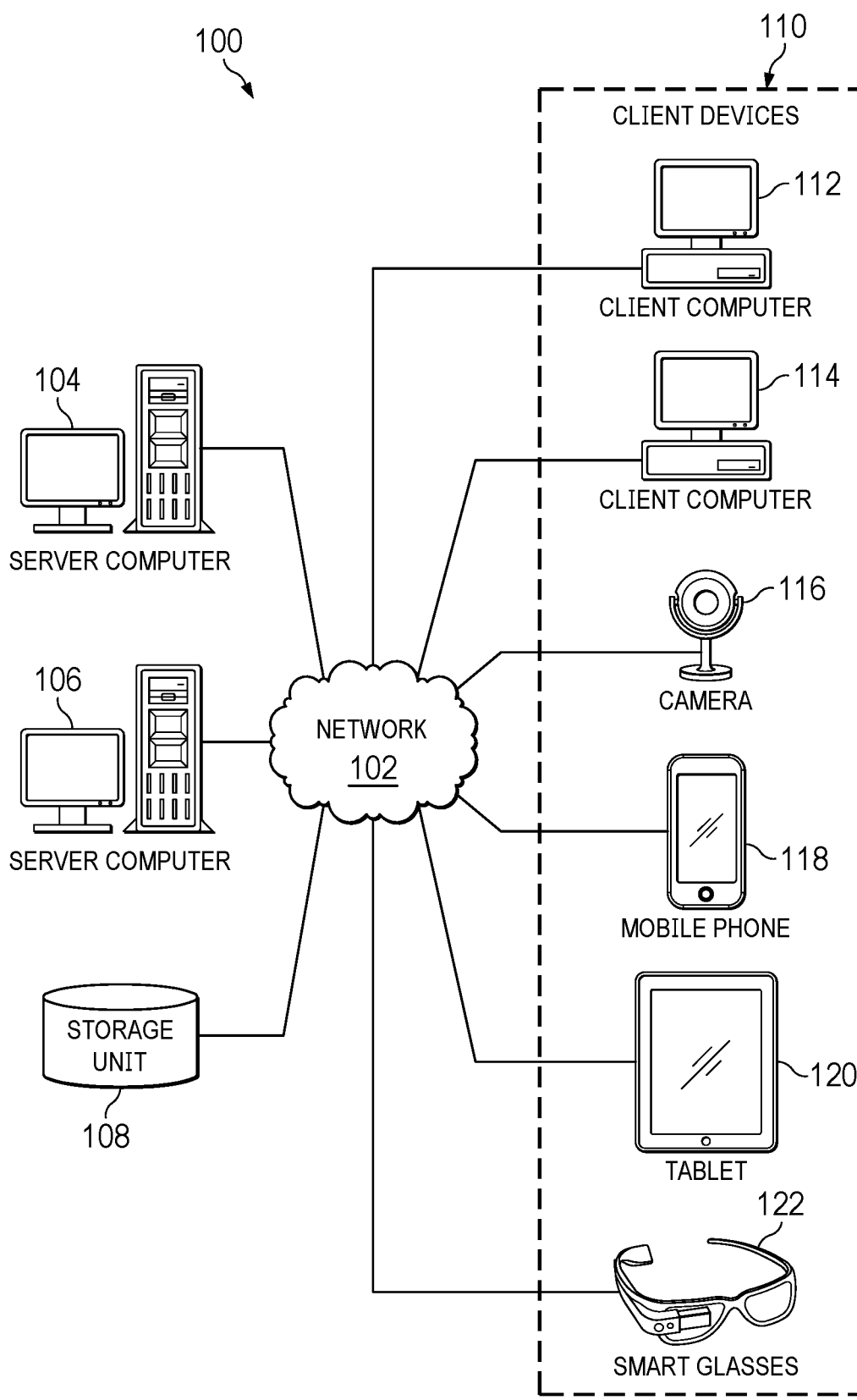
FIG. 1 is a pictorial representation of a network of data processing systems in which illustrative embodiments can be implemented.

The illustrative embodiments recognize and take into account one or more different considerations as described herein. For example, the illustrative embodiments recognize and take into account that visualization of data common to a physical product is a critical requirement in support of digital enterprises.

The illustrative embodiments recognize and take into account that existing solutions to visualization require the manual placement of icons to depict individual data sets. Consequently, the amount of data that can be added is limited by the number of users updating and adding information. The illustrative embodiments recognize and take into account that this approach requires duplicated effort of capturing the information and then manually visualizing each data set within a spherical image.

The illustrative embodiments provide context visualization utilizing a localized three-point coordinate common to the location and a referenced data source. The 360-degree spherical image's origin point serves as a fulcrum to derive the visualized coordinate of any location in the space. The camera itself becomes the origin point in the space and the spherical image. The illustrative embodiments utilize an initial known common vector common to the space and the origin point of the capture (camera) location to automatically display data sets at their recorded position within the recorded space.

The illustrative embodiments solve the technical problem of visualizing quality documentation relative to the recorded physical space, which supports clear, actionable data in support of standard manufacturing requirements. Context visualization expands the use case for remote inspections, training, root cause correction action and data analysis. Massive or discrete data sets can be instantly visualized with a recorded spherical image relative to their documented locations. For example, part locations, engineering drawings, assembly instructions, non-conformances, and maintenance data can be easily visualized without manual plotting or additional data manipulation such as manual edits, additions, or updates.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As used herein, "a number of" when used with reference to items, means one or more items. For example, "a number of different types of networks" is one or more different types of networks. In illustrative example, a "set of" as used with reference items means one or more items. For example, a set of metrics is one or more of the metrics.

With reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 might include connections, such as wire, wireless communication links, or fiber optic cables.

In the depicted example, server computer 104 and server computer 106 connect to network 102 along with storage unit 108. In addition, client devices 110 connect to network 102. In the depicted example, server computer 104 provides information, such as boot files, operating system images, and applications to client devices 110. Client devices 110 can be, for example, computers, workstations, or network computers. As depicted, client devices 110 include client computers 112 and 114. Client devices 110 can also include other types of client devices such as CAMERA 116, mobile phone 118, tablet computer 120, and smart glasses 122.

In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

Figure 2:
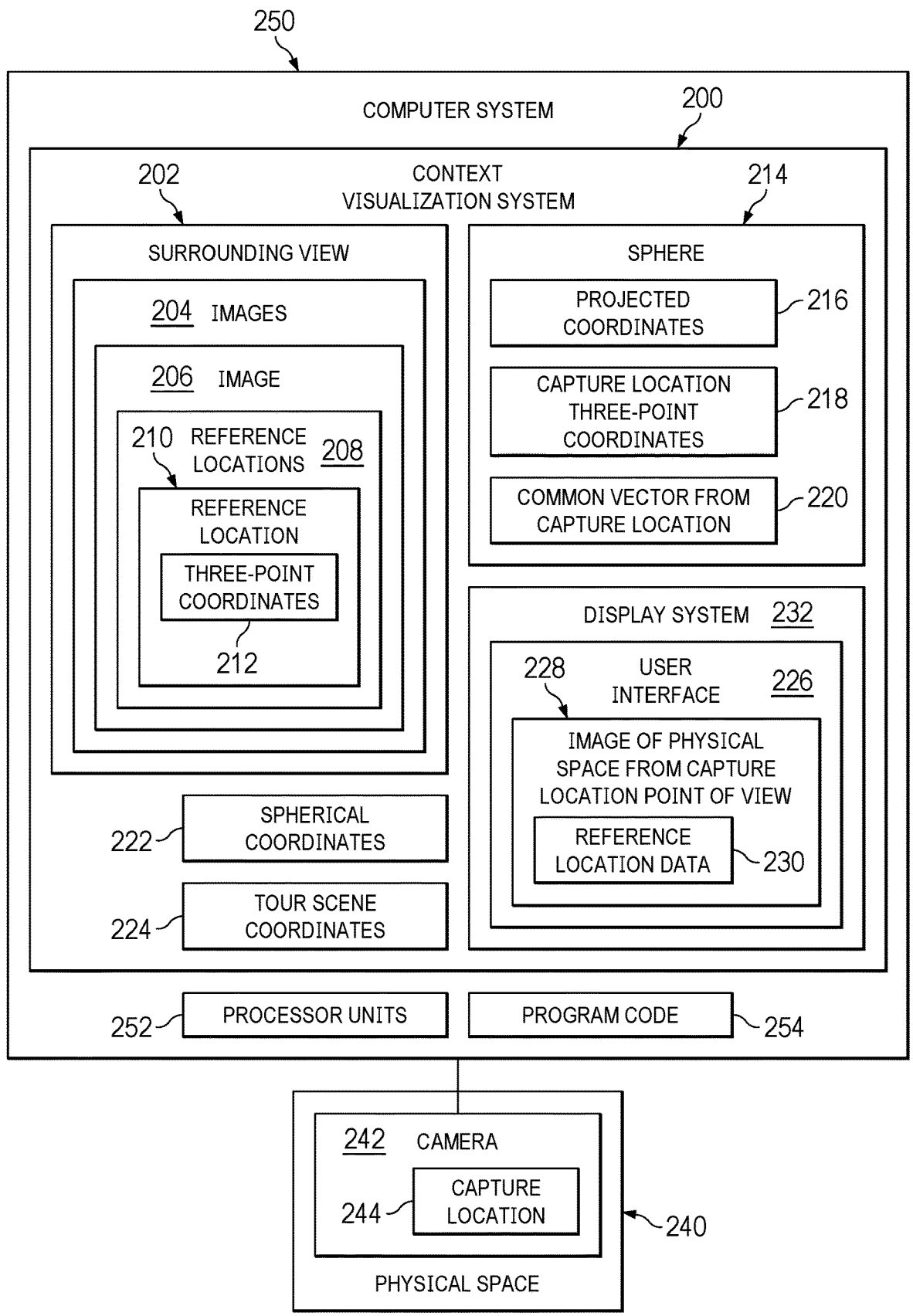
FIG. 2 is an illustration of a block diagram of a context visualization system in accordance with an illustrative embodiment.

With reference now to FIG. 2, an illustration a block diagram of a context visualization system is depicted in accordance with an illustrative embodiment. In this illustrative example, context visualization system 200 includes components that can be implemented in hardware such as the hardware shown in network data processing system 100 in FIG. 1.

Context visualization system receives a number of images 204 from a camera 242 located in a physical space 240. Physical space could be, e.g., an interior of an aircraft or other vehicle, a compartment with such a vehicle, an interior of a building such as a factory, or any environment for which a user desires to create a reference visualization for other users. Camera 242 may be a rotatable camera capable of imaging 360° around the capture location 244 of the camera within the physical space 240.

Context visualization system 200 stiches the images 204 together to create a surround view 202 of the physical space 240 around the capture location 244 of the camera 242. Each image 206 may include a number of reference locations within the physical space 240. Each reference location 210 has corresponding three-point coordinates 212 (i.e., x, y, z).

Context visualization system 200 creates a sphere 214 or projected coordinates 216 around the capture location 244. The three-point coordinates 218 corresponding to the capture location 244 serve as the center of the sphere 214 (see FIG. 3).

Context visualization system 200 translates the corresponding three-point coordinates 212 of each reference location 210 into spherical coordinates 222 that can be projected from two-dimensional images in images 204 onto the circumference of sphere 214.

Context visualization system 200 translates the spherical coordinates 222 to tour scene coordinates 224.

User interface 226 displays an image 228 of the physical space 240 from the point of view of the capture location 244 on display system 232. Display system 232 is a physical hardware system and includes one or more display devices on which user interface 226 can be displayed. User interface 226 can be a graphical user interface.

The display devices in display system 232 can include at least one of a light emitting diode (LED) display, a liquid crystal display (LCD), an organic light emitting diode (OLED) display, a computer monitor, a projector, a flat panel display, a heads-up display (HUD), a head-mounted display (HMD), or some other suitable device that can output information for the visual presentation of information.

Superimposed on this image 228 may be reference location data 230 such as, for example, part location, engineering drawings, assembly instructions, known non-conformances, or fleet maintenance data. This reference location data 230 is associated with particular three-point locations. Context visualization system 200 determines where to visualize the reference location data 230 in image 228 by translating spherical coordinates 222 on the circumference of sphere 214 between a known common vector 220 and the desired data display location based on the three-point coordinates 218 (origin point) of the capture location.

Context visualization system 200 can be implemented in software, hardware, firmware, or a combination thereof. When software is used, the operations performed by context visualization system 200 can be implemented in program code configured to run on hardware, such as a processor unit. When firmware is used, the operations performed by context visualization system 200 can be implemented in program code and data and stored in persistent memory to run on a processor unit. When hardware is employed, the hardware can include circuits that operate to perform the operations in context visualization system 200.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 250 is a physical hardware system and includes one or more data processing systems. When more than one data processing system is present in computer system 250, those data processing systems are in communication with each other using a communications medium. The communications medium can be a network. The data processing systems can be selected from at least one of a computer, a server computer, a tablet computer, or some other suitable data processing system.

As depicted, computer system 250 includes a number of processor units 252 that are capable of executing program code 254 implementing processes in the illustrative examples. As used herein a processor unit in the number of processor units 252 is a hardware device and is comprised of hardware circuits such as those on an integrated circuit that respond and process instructions and program code that operate a computer. When a number of processor units 252 execute program code 254 for a process, the number of processor units 252 is one or more processor units that can be on the same computer or on different computers. In other words, the process can be distributed between processor units on the same or different computers in a computer system. Further, the number of processor units 252 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

Figure 3:
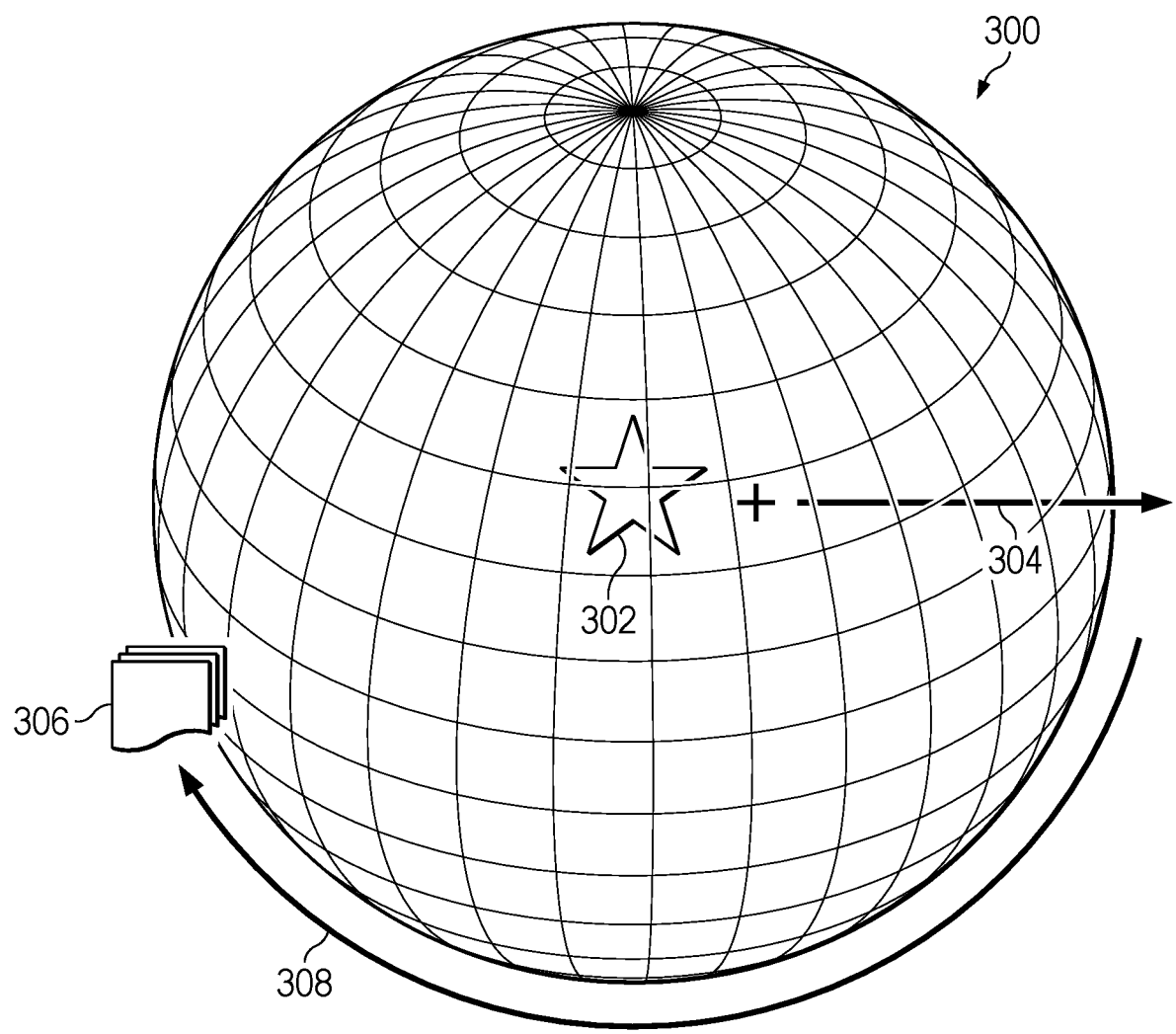
FIG. 3 depicts a diagram illustrating a projected sphere of coordinates in accordance with an illustrative embodiment.

FIG. 3 depicts a diagram illustrating a projected sphere of coordinates in accordance with an illustrative embodiment. Sphere 300 might be an example of sphere 214 in FIG. 2.

The sphere 300 comprises projected coordinates based on the capture location 302. The capture location 302 is a three-point location representing the position of the camera in the space and is associated with a defined direction (vector) 304 relative to the space within the sphere 300 that is common to all the projected coordinates.

Utilizing a localized three-point coordinate common to the product or physical location and referenced data source, the 360° spherical image's capture location (central origin point) 302 can be utilized as a fulcrum to derive the visualized coordinate of any data point that includes a three-point location in that space. Based on the central capture location 302 and the common vector 304, the context visualization system is able to translate (308) any data point 306 associated with a three-point location in space to a coordinate on the circumference of the sphere 300. This translation allows data sets to be automatically displayed at their recorded position within the recorded space (see FIGS. 5-7).

Figure 4:
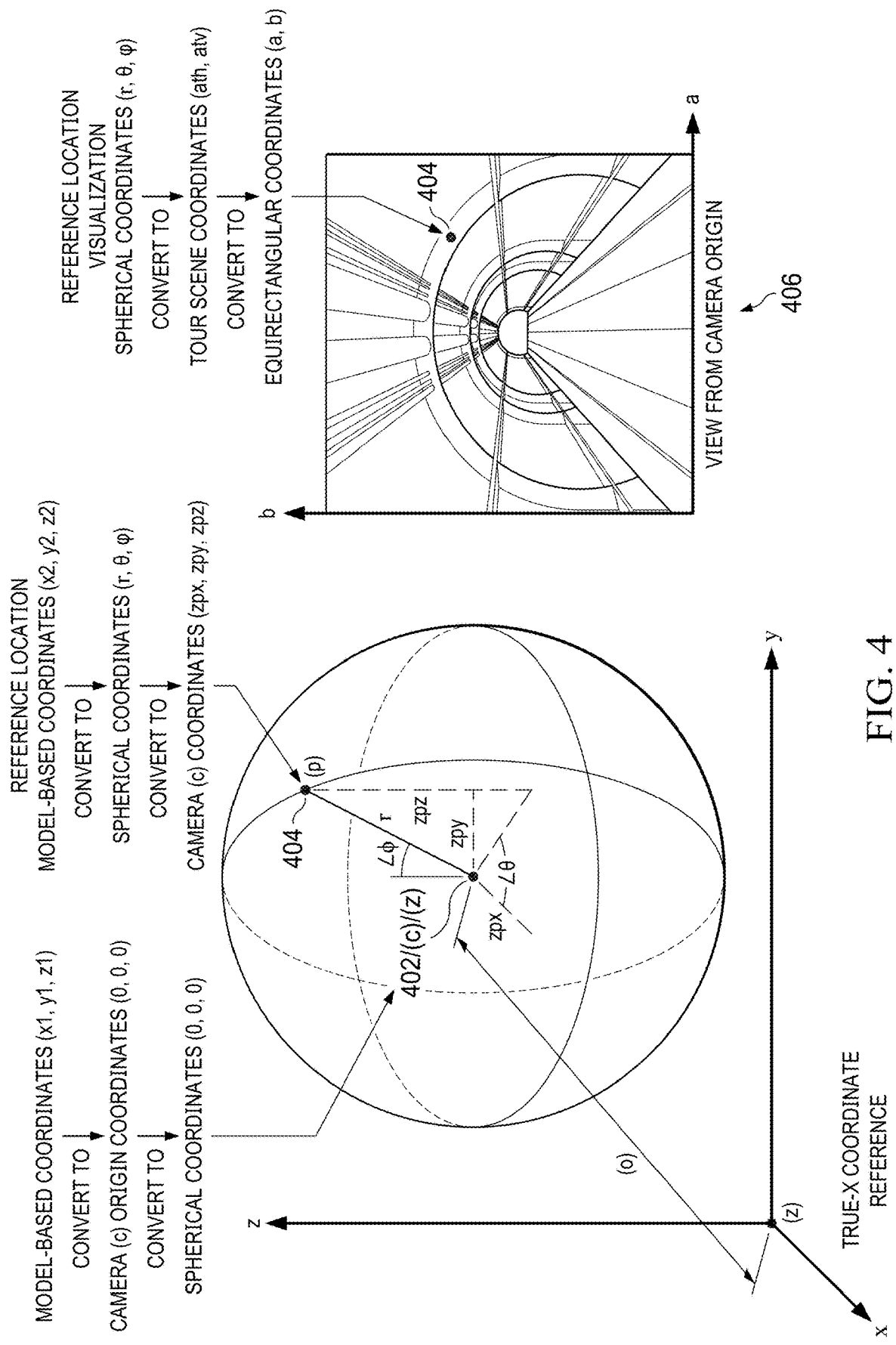
FIG. 4 depicts a diagram illustrating the process of translating true three-point coordinates to equirectangular coordinates for display in accordance with an illustrative embodiment.

FIG. 4 depicts a diagram illustrating the process of translating true three-point coordinates to equirectangular coordinates for display in accordance with an illustrative embodiment. This translation process may be performed by context visualization system 200 shown in FIG. 2.

Camera location 402 (as origin) and reference location 404 (e.g., part or installation plan location) are converted from True-X Coordinates (x,y,z), or model-based coordinates, to relative spherical coordinates (r, θ, φ). From spherical coordinates, the reference location is then converted into relative virtual tour scene coordinates. The reference location is then converted from virtual tour scene coordinates into equirectangular orthogonal coordinates (a,b) of the displayed view from the camera (c) origin (z). This equirectangular output is then displayed within the spherical space in a view 406 from the camera origin point of view.

The camera (c) coordinates represent the real-world capture location, camera location 402, in reference to the 3D representation of the real world object for the spherical image in Cartesian coordinates: x1, the x axis position of the camera in 3D space; y1, The y axis position of the camera in 3D space; and z1, the z axis position of the camera in 3D space.

The reference location 404 is a point of interest (p) for visualization in Cartesian coordinates: x2, the x axis position of the point of interest in 3D space; y2, the y axis position of the point of interest in 3D space; and z2, the z axis position of the point of interest in 3D space.

Offset (o) is the distance from the camera location 402 to the Cartesian coordinate origin of the 3D representation of the real-world object, (0,0,0): −x1, the inverse of the x axis position of the camera in 3D space; −y1, the inverse of the y axis position of the camera in 3D space; and −z1, the inverse of the z axis position of the camera in 3D space.

Zero point (z) is the point of interest (p) plus the offset (o), creating the point location in reference to the Cartesian coordinate origin: zpx, the relative position of the point (p) on the x axis to the camera, but in relation to the Cartesian coordinate origin of the 3D representation of the real-world object; zpy, the relative position of the point (p) on the y axis to the camera, but in relation to the Cartesian coordinate origin of the 3D representation of the real world object; and zpz, the relative position of the point (p) on the z axis to the camera, but in relation to the Cartesian coordinate origin of the 3D representation of the real world object.

In the spherical coordinate system, the radius (r) is the distance between the camera (c) and the point of interest (p). Phi ($\varphi$) is the polar angle. Theta ($\theta$) is the azimuthal angle.

In the virtual tour coordinate system ath is the horizontal rotation, and atv is the vertical rotation.

The zero point may be calculated:

$$zpx = x2 + -x1$$

$$zpy = y2 + -y1$$

$$zpz = z2 + -z1$$

The conversion from Cartesian to spherical coordinates may be calculated:

$$r = \sqrt{zpx^2 + zpy^2 + zpz^2}$$

$$\varphi = \frac{\cos^{-1}\left(\frac{zpz}{r}\right) \times 180}{\pi}$$

$$\theta = \frac{\tan^{-1}\left(\frac{zpy}{zpx}\right) \times 180}{\pi}$$

The logic for converting spherical to virtual tour coordinates may be:

```
ath:
if(θ ≥ 0){
    if(θ ≥ 180){
        ath = 180 − (θ − 180)
    } else {
        ath = θ
    }
} else {
    if(θ <= −180){
        ath = −180 + (θ + 180)
    } else {
        ath = θ
    }
}
atv:
atv = −1 * (90 − φ)
```

The illustrative embodiments provide a repeatable process for using any photograph as a base for contextual visualization. Though the concept is based on a 360° sphere, the same capability may be applied to any photograph or video image.

Figure 5:
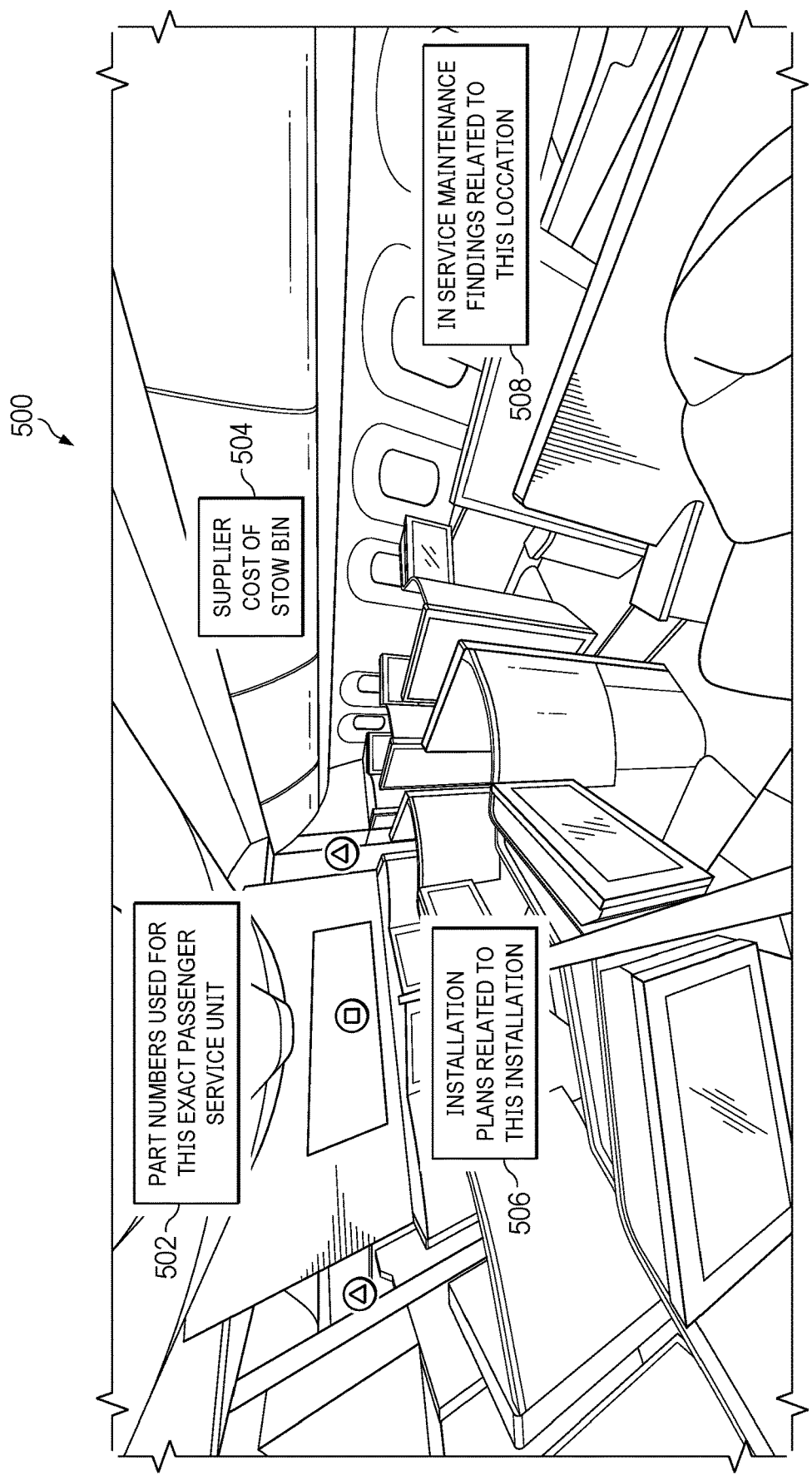
FIG. 5 depicts an example of context visualization applied to an image of an aircraft cabin in accordance with an illustrative embodiment.
Figure 6:
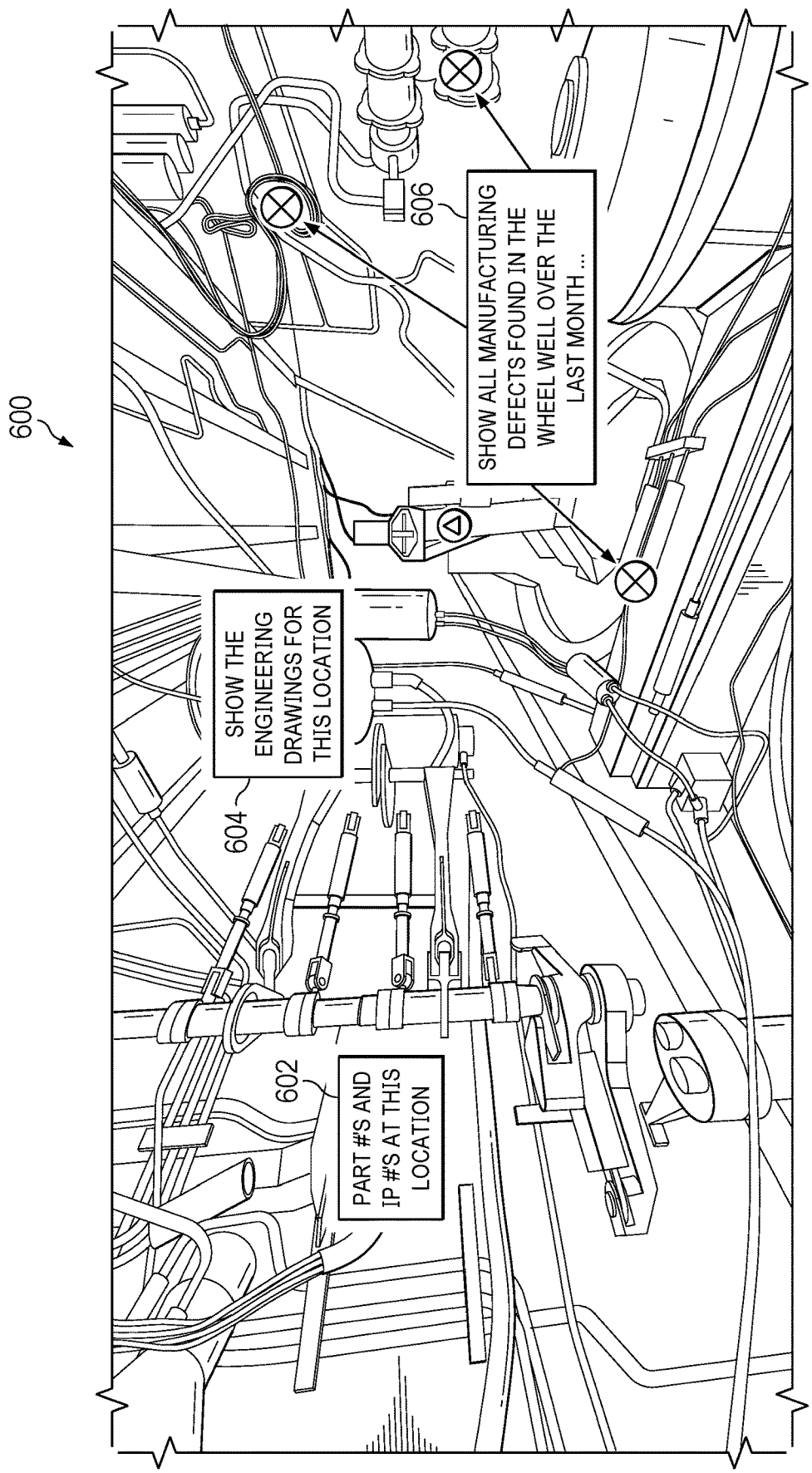
FIG. 6 depicts an example of context visualization applied to an image of an aircraft landing gear compartment in accordance with an illustrative embodiment.
Figure 7:
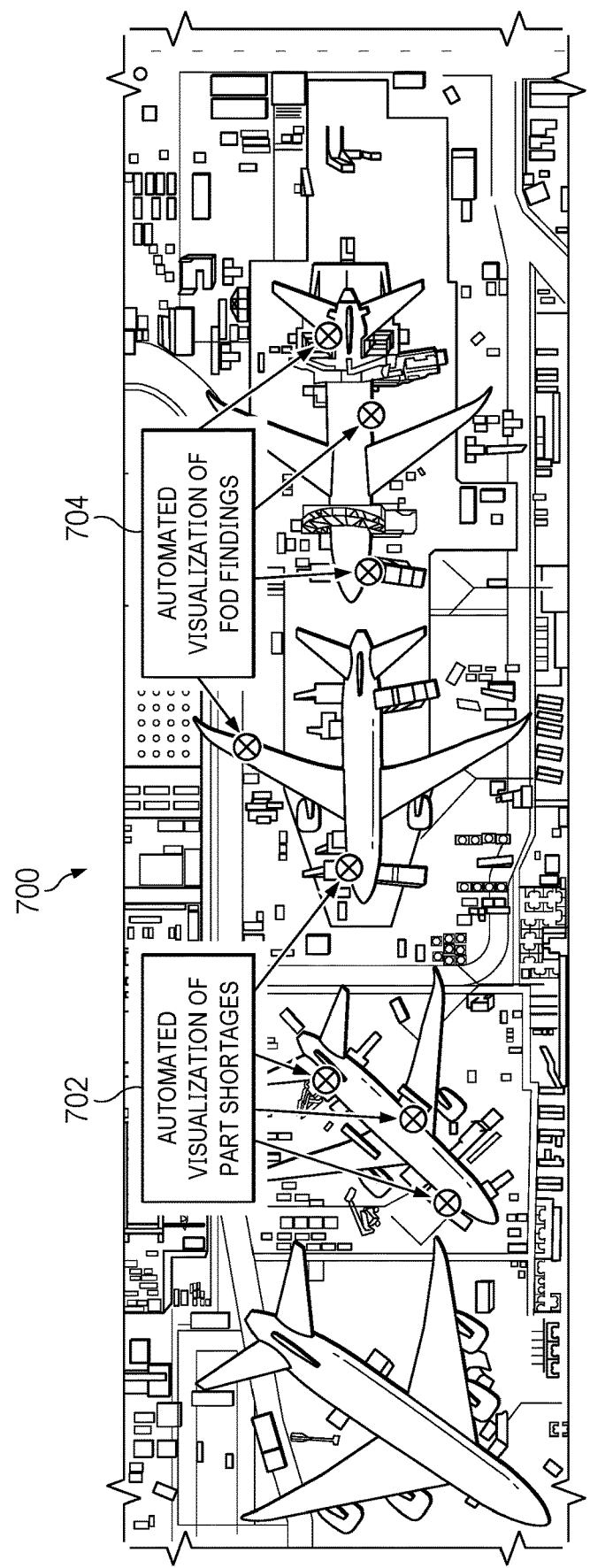
FIG. 7 depicts an example of context visualization applied to an image of a factory floor 700 in accordance with an illustrative embodiment.

FIGS. 5-7 depicts diagrams illustrating different examples of context visualization applied in different settings. All of these settings are possible example of physical space 240 in FIG. 2.

FIG. 5 depicts an example of context visualization applied to an image of an aircraft cabin 500 in accordance with an illustrative embodiment. Within this image, datapoints are displayed at various reference locations, which may be example of reference location data 230 in FIG. 2.

In this particular example, the datapoints include part numbers used for a passenger service unit 502, the supplier cost of a stow bin 504, installation plans related to a passenger entertainment display system 506, and in-service maintenance finding related to a window seat location 508.

FIG. 6 depicts an example of context visualization applied to an image of an aircraft landing gear compartment 600 in accordance with an illustrative embodiment. In this example, visualized data points include part numbers and installation plan (IP) numbers for components located on the left of the image 602, engineering drawings superimposed over the upper center of the image 604, and manufacturing defects found in the wheel well over the last month 606.

These are merely illustrative examples, but particularly within the context of a visually complex space such as compartment 600, which may include thousands of visible components, the ability to visualize data at the specific locations where it is relevant has the potential for tremendous time savings and increased accuracy in the application of data where and when it is needed. The visualization also provides a way to connect data and surface patterns in a manner that would otherwise be difficult to visualize.

FIG. 7 depicts an example of context visualization applied to an image of a factory floor 700 in accordance with an illustrative embodiment. This example of context visualization provides not only visualization in the context of space but also in the context of process.

In the present example, data points visualized in the image include automated visualization of part shortages 702 and automated visualization of foreign object debris (FOD) findings 704 at relevant locations. In the context of processes such as manufacturing or servicing, such data point visualization not only provides information regarding what is needed and where but also where in the process it may be occurring and how it is likely to affect the process.

Figure 8:
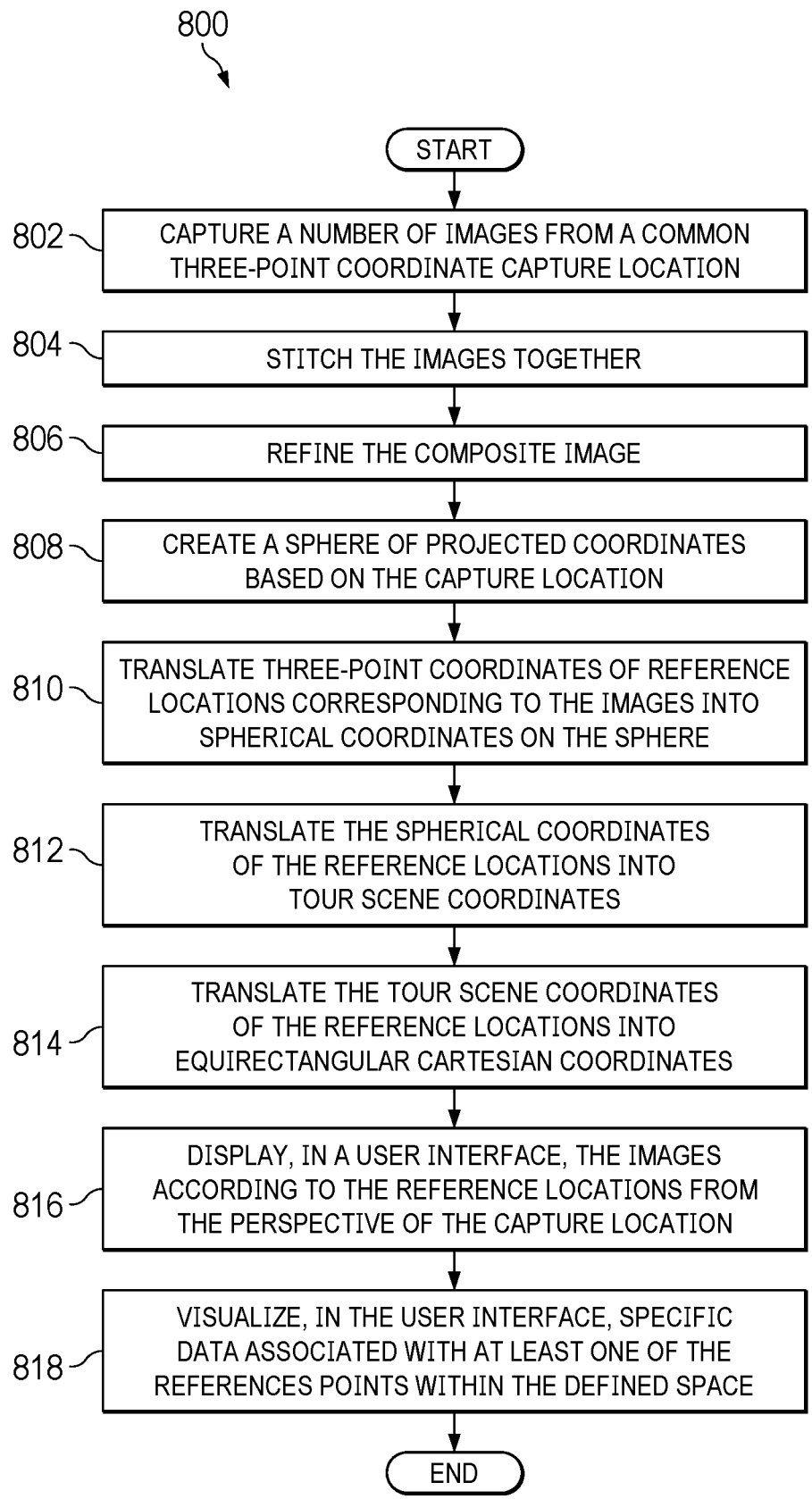
FIG. 8 depicts a flowchart of a process for visualization within a spherical space in accordance with an illustrative embodiment.

FIG. 8 depicts a flowchart of a process for visualization within a spherical space in accordance with an illustrative embodiment. The process in FIG. 8 can be implemented in hardware, software, or both. When implemented in software, the process can take the form of program code that is run by one of more processor units located in one or more hardware devices in one or more computer systems. For example, the process can be implemented in context visualization system 200 in computer system 250 in FIG. 2.

Process 800 begins by capturing a number of images from a common three-point coordinate capture location (i.e., a camera position) (operation 802). The images, collectively, encompass a view surrounding the capture location, which may be a 360-degree spherical view surrounding the capture location. The system may then stitch the images together into a single composite image (operation 804) and refine the composite image (operation 806).

The system creates a sphere of projected coordinates based on the capture location (operation 808) and translates three-point coordinates of reference locations corresponding to the images into spherical coordinates on the sphere (operation 810).

Then system then translates the spherical coordinates of the reference locations into tour scene coordinates (operation 812).

The tour scene coordinates of the reference locations are translated into equirectangular Cartesian coordinates (operation 814), and the images are displayed in a user interface according to the reference locations from the perspective of the capture location (operation 816). The images are displayed based on a known common vector relative to the spherical space originating from the capture location.

Process 800 may further comprise visualizing, in the user interface, specific data associated with at least one of the references points within the defined space (operation 818). The specific data may comprise at least one of part location, engineering drawings, assembly instructions, known non-conformances, or fleet maintenance data. Process 800 then ends.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 9:
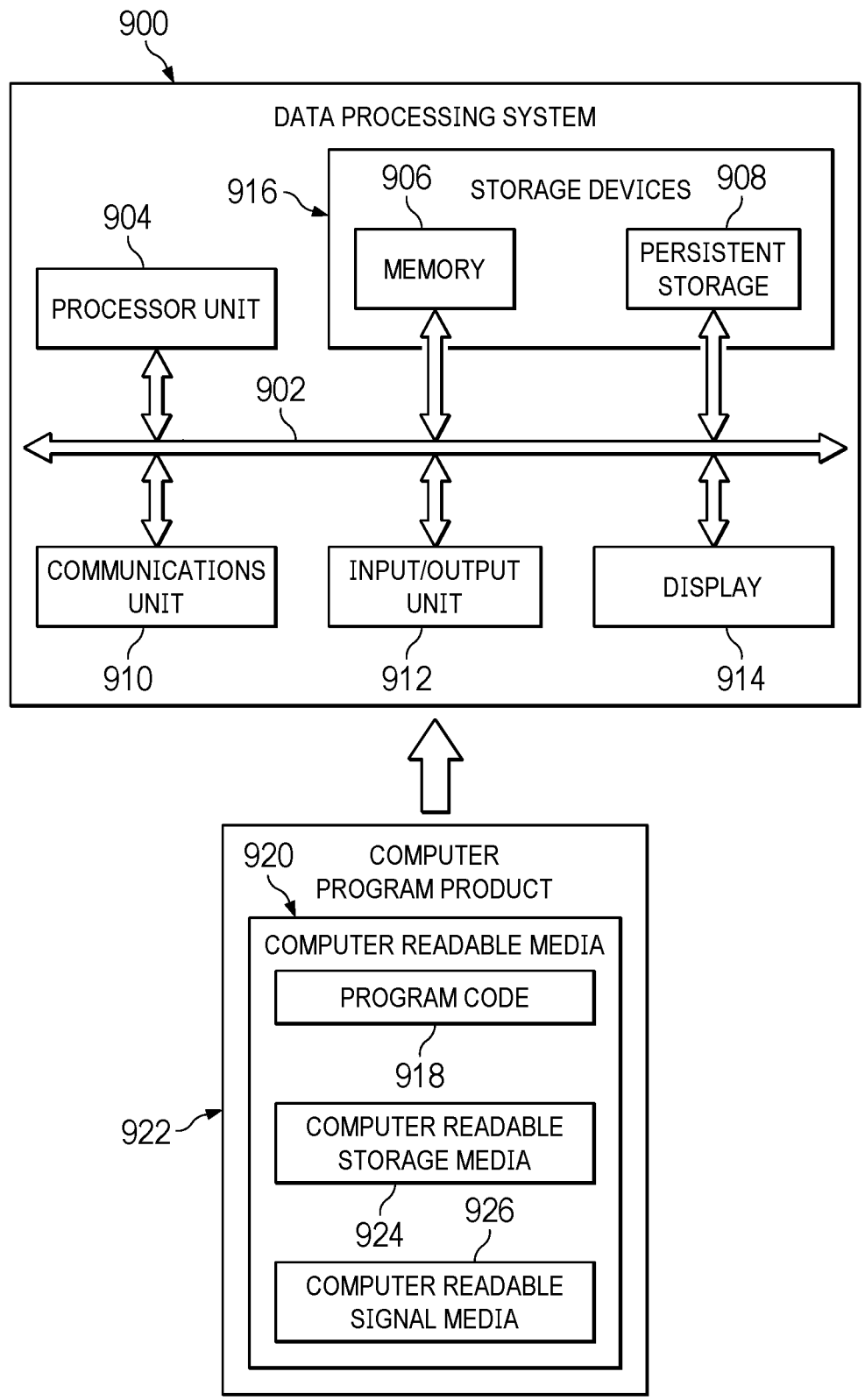
FIG. 9 is an illustration of a block diagram of a data processing system in accordance with an illustrative embodiment.

Turning now to FIG. 9, an illustration of a block diagram of a data processing system is depicted in accordance with an illustrative embodiment. Data processing system 900 may be used to implement server computers 104 and 106 and client devices 110 in FIG. 1, as well as computer system 250 in FIG. 2. In this illustrative example, data processing system 900 includes communications framework 902, which provides communications between processor unit 904, memory 906, persistent storage 908, communications unit 910, input/output (I/O) unit 912, and display 914. In this example, communications framework 902 takes the form of a bus system.

Processor unit 904 serves to execute instructions for software that may be loaded into memory 906. Processor unit 904 may be a number of processors, a multi-processor core, or some other type of processor, depending on the particular implementation. In an embodiment, processor unit 904 comprises one or more conventional general-purpose central processing units (CPUs). In an alternate embodiment, processor unit 904 comprises one or more graphical processing units (GPUs).

Memory 906 and persistent storage 908 are examples of storage devices 916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 916 may also be referred to as computer-readable storage devices in these illustrative examples. Memory 906, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908. Communications unit 910, in these illustrative examples, provides for communications with other data processing systems or devices. In these illustrative examples, communications unit 910 is a network interface card.

Input/output unit 912 allows for input and output of data with other devices that may be connected to data processing system 900. For example, input/output unit 912 may provide a connection for user input through at least one of a keyboard, a mouse, or some other suitable input device. Further, input/output unit 912 may send output to a printer. Display 914 provides a mechanism to display information to a user.

Instructions for at least one of the operating system, applications, or programs may be located in storage devices 916, which are in communication with processor unit 904 through communications framework 902. The processes of the different embodiments may be performed by processor unit 904 using computer-implemented instructions, which may be located in a memory, such as memory 906.

These instructions are referred to as program code, computer-usable program code, or computer-readable program code that may be read and executed by a processor in processor unit 904. The program code in the different embodiments may be embodied on different physical or computer-readable storage media, such as memory 906 or persistent storage 908.

Program code 918 is located in a functional form on computer-readable media 920 that is selectively removable and may be loaded onto or transferred to data processing system 900 for execution by processor unit 904. Program code 918 and computer-readable media 920 form computer program product 922 in these illustrative examples. In one example, computer-readable media 920 may be computer-readable storage media 924 or computer-readable signal media 926.

In these illustrative examples, computer-readable storage media 924 is a physical or tangible storage device used to store program code 918 rather than a medium that propagates or transmits program code 918. Computer readable storage media 924, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 918 may be transferred to data processing system 900 using computer-readable signal media 926. Computer-readable signal media 926 may be, for example, a propagated data signal containing program code 918. For example, computer-readable signal media 926 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 900 are not meant to provide architectural limitations to the manner in which different embodiments may be implemented. The different illustrative embodiments may be implemented in a data processing system including components in addition to or in place of those illustrated for data processing system 900. Other components shown in FIG. 9 can be varied from the illustrative examples shown. The different embodiments may be implemented using any hardware device or system capable of running program code 918.

Figure 10:
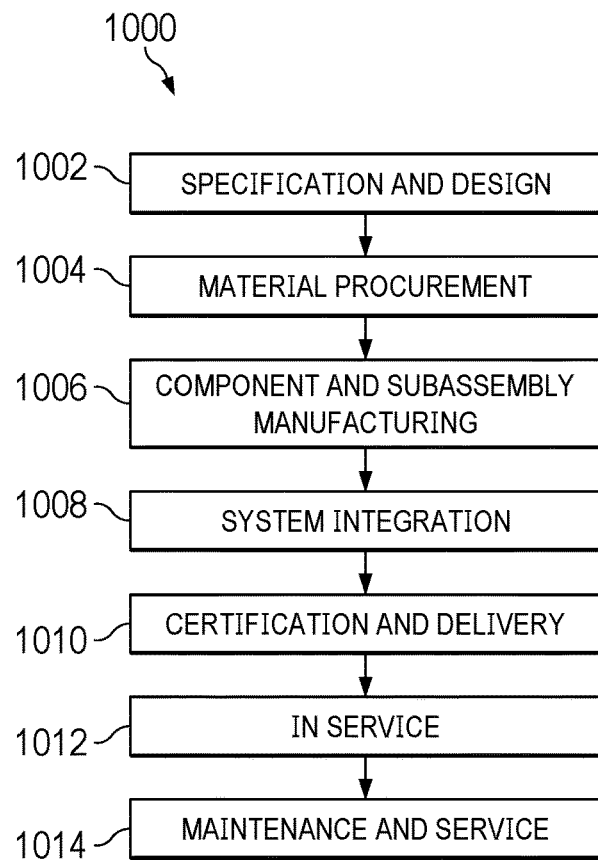
FIG. 10 is an illustration of an aircraft manufacturing and service method in accordance with an illustrative embodiment.
Figure 11:
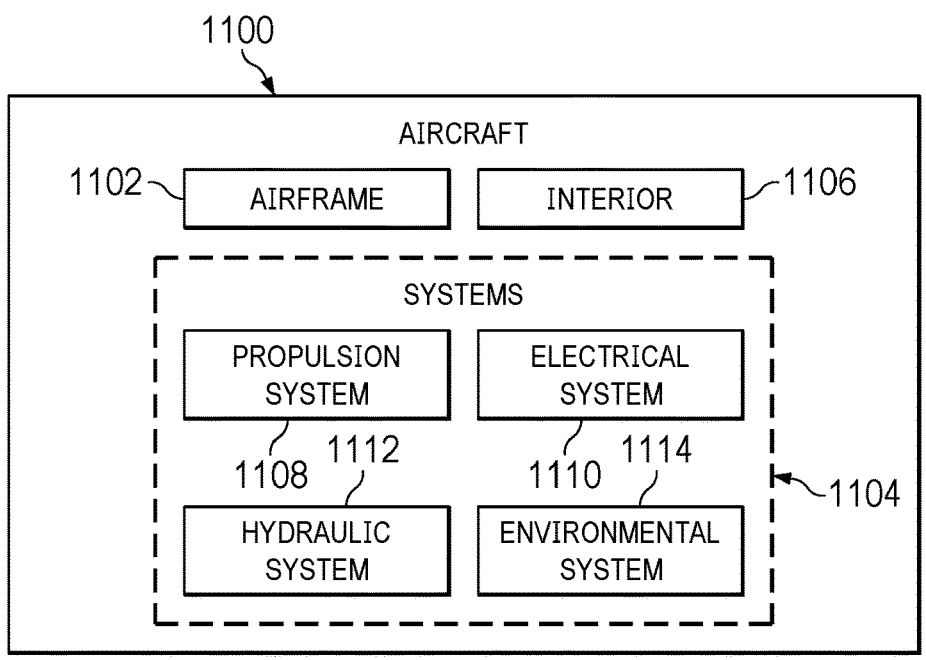
FIG. 11 is an illustration of a block diagram of an aircraft in which an illustrative embodiment may be implemented.

Illustrative embodiments of the disclosure may be described in the context of aircraft manufacturing and service method 1000 as shown in FIG. 10 and aircraft 1100 as shown in FIG. 11. Turning first to FIG. 10, an illustration of an aircraft manufacturing and service method is depicted in accordance with an illustrative embodiment. During preproduction, aircraft manufacturing and service method 1000 may include specification and design 1002 of aircraft 1100 in FIG. 11 and material procurement 1004.

During production, component and subassembly manufacturing 1006 and system integration 1008 of aircraft 1100 in FIG. 11 takes place. Thereafter, aircraft 1100 in FIG. 11 can go through certification and delivery 1010 in order to be placed in service 1012. While in service 1012 by a customer, aircraft 1100 in FIG. 11 is scheduled for routine maintenance and service 1014, which may include modification, reconfiguration, refurbishment, and other maintenance or service.

Each of the processes of aircraft manufacturing and service method 1000 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 11, an illustration of an aircraft is depicted in which an illustrative embodiment may be implemented. In this example, aircraft 1100 is produced by aircraft manufacturing and service method 1000 in FIG. 10 and may include airframe 1102 with plurality of systems 1104 and interior 1106. Examples of systems 1104 include one or more of propulsion system 1108, electrical system 1110, hydraulic system 1112, and environmental system 1114. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1000 in FIG. 10.

In one illustrative example, components or subassemblies produced in component and subassembly manufacturing 1006 in FIG. 10 can be fabricated or manufactured in a manner similar to components or subassemblies produced while aircraft 1100 is in service 1012 in FIG. 10. As yet another example, one or more apparatus embodiments, method embodiments, or a combination thereof can be utilized during production stages, such as component and subassembly manufacturing 1006 and system integration 1008 in FIG. 10. One or more apparatus embodiments, method embodiments, or a combination thereof may be utilized while aircraft 1100 is in service 1012, during maintenance and service 1014 in FIG. 10, or both. The use of a number of the different illustrative embodiments may substantially expedite the assembly of aircraft 1100, reduce the cost of aircraft 1100, or both expedite the assembly of aircraft 1100 and reduce the cost of aircraft 1100.

Figure 12:
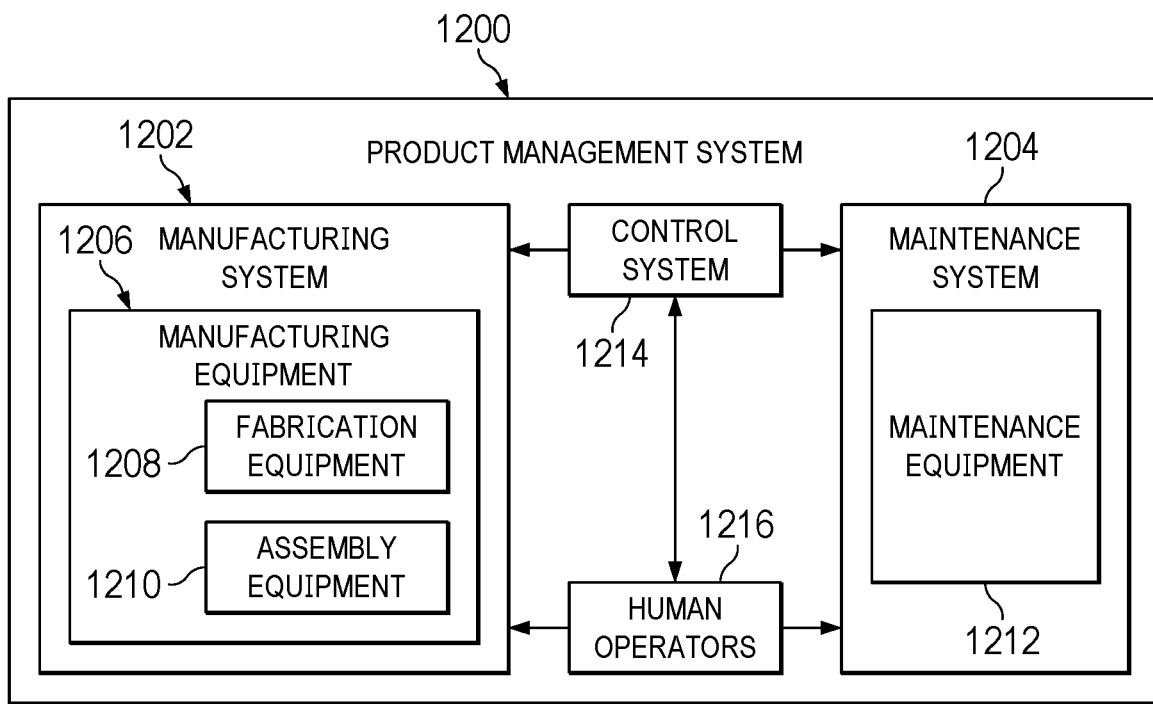
FIG. 12 is an illustration of a block diagram of a product management system is depicted in accordance with an illustrative embodiment.

Turning now to FIG. 12, an illustration of a block diagram of a product management system is depicted in accordance with an illustrative embodiment. Product management system 1200 is a physical hardware system. In this illustrative example, product management system 1200 includes at least one of manufacturing system 1202 or maintenance system 1204.

Manufacturing system 1202 is configured to manufacture products, such as aircraft 1100 in FIG. 11. As depicted, manufacturing system 1202 includes manufacturing equipment 1206. Manufacturing equipment 1206 includes at least one of fabrication equipment 1208 or assembly equipment 1210.

Fabrication equipment 1208 is equipment that used to fabricate components for parts used to form aircraft 1100 in FIG. 11. For example, fabrication equipment 1208 can include machines and tools. These machines and tools can be at least one of a drill, a hydraulic press, a furnace, an autoclave, a mold, a composite tape laying machine, an automated fibre placement (AFP) machine, a vacuum system, a robotic pick and place system, a flatbed cutting machine, a laser cutter, a computer numerical control (CNC) cutting machine, a lathe, or other suitable types of equipment. Fabrication equipment 1208 can be used to fabricate at least one of metal parts, composite parts, semiconductors, circuits, fasteners, ribs, skin panels, spars, antennas, or other suitable types of parts.

Assembly equipment 1210 is equipment used to assemble parts to form aircraft 1100 in FIG. 11. In particular, assembly equipment 1210 is used to assemble components and parts to form aircraft 1100 in FIG. 11. Assembly equipment 1210 also can include machines and tools. These machines and tools may be at least one of a robotic arm, a crawler, a faster installation system, a rail-based drilling system, or a robot. Assembly equipment 1210 can be used to assemble parts such as seats, horizontal stabilizers, wings, engines, engine housings, landing gear systems, and other parts for aircraft 1100 in FIG. 11.

In this illustrative example, maintenance system 1204 includes maintenance equipment 1212. Maintenance equipment 1212 can include any equipment needed to perform maintenance on aircraft 1100 in FIG. 11. Maintenance equipment 1212 may include tools for performing different operations on parts on aircraft 1100 in FIG. 11. These operations can include at least one of disassembling parts, refurbishing parts, inspecting parts, reworking parts, manufacturing replacement parts, or other operations for performing maintenance on aircraft 1100 in FIG. 11. These operations can be for routine maintenance, inspections, upgrades, refurbishment, or other types of maintenance operations.

In the illustrative example, maintenance equipment 1212 may include ultrasonic inspection devices, x-ray imaging systems, vision systems, drills, crawlers, and other suitable devices. In some cases, maintenance equipment 1212 can include fabrication equipment 1208, assembly equipment 1210, or both to produce and assemble parts that needed for maintenance.

Product management system 1200 also includes control system 1214. Control system 1214 is a hardware system and may also include software or other types of components. Control system 1214 is configured to control the operation of at least one of manufacturing system 1202 or maintenance system 1204. In particular, control system 1214 can control the operation of at least one of fabrication equipment 1208, assembly equipment 1210, or maintenance equipment 1212.

The hardware in control system 1214 can be implemented using hardware that may include computers, circuits, networks, and other types of equipment. The control may take the form of direct control of manufacturing equipment 1206. For example, robots, computer-controlled machines, and other equipment can be controlled by control system 1214. In other illustrative examples, control system 1214 can manage operations performed by human operators 1216 in manufacturing or performing maintenance on aircraft 1100. For example, control system 1214 can assign tasks, provide instructions, display models, or perform other operations to manage operations performed by human operators 1216. In these illustrative examples, control system 1214 to manage at least one of the manufacturing or maintenance of aircraft 1100 in FIG. 11 to employ a fuel tank protection system within fuel tanks for aircraft 1100. The fuel protection system can be implemented in fuel tanks during manufacturing fuel tanks for adding fuel tanks during maintenance to aircraft 1100.

In the different illustrative examples, human operators 1216 can operate or interact with at least one of manufacturing equipment 1206, maintenance equipment 1212, or control system 1214. This interaction can occur to manufacture aircraft 1100 in FIG. 11.

Of course, product management system 1200 may be configured to manage other products other than aircraft 1100 in FIG. 11. Although product management system 1200 has been described with respect to manufacturing in the aerospace industry, product management system 1200 can be configured to manage products for other industries. For example, product management system 1200 can be configured to manufacture products for the automotive industry as well as any other suitable industries.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for visualization within a spherical space, the method comprising using a number of processors performing operations of:
    capturing a number of images of a product from a capture location defined in a three-point model-based coordinate system to the product and data sets associated therewith;
    creating a sphere of projected coordinates based on the capture location;
    translating three-point coordinates of reference locations corresponding to the images into spherical coordinates on the sphere;
    translating the spherical coordinates of the reference locations into tour scene coordinates;
    translating the tour scene coordinates of the reference locations into equirectangular Cartesian coordinates;
    displaying, in a user interface, the images according to the reference locations from a perspective of the capture location; and
    visualizing, in the user interface for a reference location in the reference locations, specific data from the data sets associated the tour scene coordinates for the reference location.

2. The method of claim 1, further comprising:
    stitching the images together into a composite image; and refining the composite image.

3. The method of claim 1, wherein the images, collectively, encompass a view surrounding the capture location.

4. The method of claim 1, wherein the images, collectively, encompass a 360-degree spherical view surrounding the capture location.

5. The method of claim 1, wherein the images are displayed based on a known common vector relative to the spherical space originating from the capture location.

6. The method of claim 1, further comprising visualizing, simultaneously for multiple reference locations in the user interface, specific data associated, respectively, with tour scene coordinates for each of the multiple reference locations.

7. The method of claim 1, wherein the specific data comprises at least one of:
a part location;
engineering drawings;
assembly instructions;
known non-conformances; or
fleet maintenance data.

8. A system for visualization within a spherical space, wherein the system comprises:
a storage device configured to store program instructions; and
one or more processors operably connected to the storage device and configured to execute the program instructions to cause the system to:
capture a number of images from a common three-point coordinate capture location;
create a sphere of projected coordinates based on the capture location;
translate three-point coordinates of reference locations corresponding to the images into spherical coordinates on the sphere;
translate the spherical coordinates of the reference locations into tour scene coordinates;
translate the tour scene coordinates of the reference locations into equirectangular Cartesian coordinates;
display, in a user interface, the images according to the reference locations from a perspective of the capture location; and
visualize, in the user interface for a reference location in the reference locations, specific data associated the tour scene coordinates for the reference location.

9. The system of claim 8, wherein the processors are further configured to execute instructions to:
stitch the images together into a composite image; and
refine the composite image.

10. The system of claim 8, wherein the images, collectively, encompass a view that surrounds the capture location.

11. The system of claim 8, wherein the images, collectively, encompass a 360-degree spherical view that surrounds the capture location.

12. The system of claim 8, wherein the images are displayed based on a known common vector relative to the spherical space that comprises an origin at the capture location.

13. The system of claim 8, wherein the specific data associated with the reference location comprises at least one of:
a part location;
engineering drawings;
assembly instructions;
known non-conformances; or
fleet maintenance data.

14. A computer program product configured to present a visualization within a spherical space, wherein the computer program product comprises a computer-readable storage medium that comprises program instructions embodied thereon and configured to:
capture a number of images from a common three-point coordinate capture location;
creating a sphere of projected coordinates based on the capture location;
translate three-point coordinates of reference locations corresponding to the images into spherical coordinates on the sphere;
translate the spherical coordinates of the reference locations into tour scene coordinates;
translate the tour scene coordinates of the reference locations into equirectangular Cartesian coordinates; and
display, in a user interface, the images according to the reference locations from a perspective of the capture location; and
visualize, in the user interface for a reference location in the reference locations, specific data associated the tour scene coordinates for the reference location.

15. The computer program product of claim 14, further comprising instructions configured to:
stitch the images together into a composite image; and
refine the composite image.

16. The computer program product of claim 14, wherein the images, collectively, encompass a view that surrounds the capture location.

17. The computer program product of claim 14, wherein the images, collectively, encompass a 360-degree spherical view that surrounds the capture location.

18. The computer program product of claim 14, wherein the program instructions are further configured to display images based on a known common vector relative to the spherical space that comprises an origin at the capture location.

19. The computer program product of claim 14, wherein the program instructions are further configured to automatically display, in the user interface, data sets associated with for the references points within the spherical space.

20. The computer program product of claim 19, wherein the specific data comprises at least one of:
a part location;
engineering drawings;
assembly instructions;
known non-conformances; or
fleet maintenance data.

* * * * *